United States Patent
Yokoyama et al.

(10) Patent No.: US 8,829,076 B2
(45) Date of Patent: Sep. 9, 2014

(54) THERMOSET COMPOSITION CONTAINING LOW MOLECULAR WEIGHT POLYTRIMETHYLENE ETHER GLYCOL

(75) Inventors: Ayumu Yokoyama, Wallingford, PA (US); Hari Babu Sunkara, Hockessin, DE (US); Rajesh Gopalan Saliya, Philadelphia, PA (US)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 0 days.

(21) Appl. No.: 13/286,273

(22) Filed: Nov. 1, 2011

(65) Prior Publication Data

US 2012/0322931 A1    Dec. 20, 2012

Related U.S. Application Data

(60) Provisional application No. 61/415,608, filed on Nov. 19, 2010.

(51) Int. Cl.
| | |
|---|---|
| *C08K 5/06* | (2006.01) |
| *C08K 5/053* | (2006.01) |
| *C09D 5/14* | (2006.01) |
| *C09D 11/10* | (2014.01) |
| *C09D 175/04* | (2006.01) |
| *C08G 18/32* | (2006.01) |

(52) U.S. Cl.
CPC .............. *C09D 175/04* (2013.01); *C09D 11/10* (2013.01); *C08K 5/053* (2013.01); *C09D 5/14* (2013.01); *C08K 5/06* (2013.01); *C08G 18/3206* (2013.01)
USPC .......................................... 523/122; 524/377

(58) Field of Classification Search
CPC ............ C08K 5/06; C08K 5/053; C09D 5/14; C09D 11/10
USPC .......................................... 523/122; 524/377
See application file for complete search history.

(56) References Cited

U.S. PATENT DOCUMENTS

| | | | | |
|---|---|---|---|---|
| 5,686,276 | A * | 11/1997 | Laffend et al. | 435/158 |
| 6,433,131 | B1 * | 8/2002 | Zhou et al. | 528/371 |
| 2010/0160538 | A1 * | 6/2010 | Fenyvesi et al. | 524/558 |

* cited by examiner

*Primary Examiner* — Kriellion Sanders
(74) *Attorney, Agent, or Firm* — Ingrassia Fisher & Lorenz, P.C.

(57) ABSTRACT

The present disclosure is directed to a thermoset composition comprising a low molecular weight polytrimethylene ether glycol. This disclosure is further directed to an antimicrobial coating composition, an antimicrobial coating layer, an antimicrobial adhesive, or an antimicrobial sealant formed from the thermoset composition comprising the low molecular weight polytrimethylene ether glycol. The thermoset compositions can be used as interior and exterior top coats, basecoats, primers, primer surfacers, primer fillers, adhesives or sealants. The disclosure is particularly directed to a thermoset composition comprising components derived from renewable resources.

2 Claims, No Drawings

THERMOSET COMPOSITION CONTAINING LOW MOLECULAR WEIGHT POLYTRIMETHYLENE ETHER GLYCOL

CROSS-REFERENCE TO RELATED APPLICATION

This application claims priority under 35 U.S.C. §119 from U.S. Provisional Application Ser. No. 61/415,608 (filed Nov. 19, 2010), the disclosures of which are incorporated by reference herein for all purposes as if fully set forth.

FIELD OF DISCLOSURE

The present disclosure is directed to an antimicrobial adhesive and sealant composition comprising components derived from renewable resources.

BACKGROUND OF DISCLOSURE

Thermoset polymer compositions are utilized to form coatings, such as, for example, primers, basecoats and clearcoats, for protective and decorative purposes; adhesives; or sealants. These polymer compositions can be used in buildings, machineries, equipments, automotive OEM (original equipment manufacturing) and refinish coatings, and other industrial or consumer-based applications. The coatings can provide one or more protective layers for the underlying substrate and can also have an aesthetically pleasing value. The adhesives or sealants can be used for binding or sealing materials or components of a product.

Antimicrobial agents and preservatives have been used to kill or inhibit the growth of harmful microorganisms. Commonly used agents can include parabens, esters of p-benzoic acid, formaldehyde releasers, isothiazolinones, organic acids, and organic alcohols. Certain metals, metal particles or metal salts, such as copper quinolinolate or silver nano-particles, can also be used as antimicrobial agents. Some of the antimicrobial agents can be used in coatings, adhesives or sealants for inhibiting the growth of microorganisms on surfaces or substrates. However, each of the antimicrobial agents can have certain limitations such as biocide tolerance, public perception, toxicity (including skin irritation or sensitization), incompatibility or insolubility with other ingredients in the formulation, stability, deactivation by pH, and odor.

There are continued needs for new thermoset compositions and new antimicrobial agents suitable for adhesives and sealants.

STATEMENT OF DISCLOSURE

This disclosure is directed to a thermoset composition comprising:
A) a thermosetting component; and
B) a polytrimethylene ether glycol having a Mn (number average molecular weight) in a range of from 100 to 490;
wherein said thermoset composition is an adhesive, a sealant, or a combination thereof.

This disclosure is also directed to an antimicrobial coating layer, an antimicrobial adhesive or an antimicrobial sealant formed from the thermoset composition of this disclosure, wherein said antimicrobial adhesive or sealant comprises said polytrimethylene ether glycol.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "antimicrobial composition" refers to a composition that comprises one or more antimicrobial agents. An antimicrobial agent can be a molecule, a reagent, a compound, or a mixture, that either kills or retards the growth of one or more microorganisms. The antimicrobial agents can include antibacterial, antiviral, antifungal, antiparisitic agents, or a combination thereof. In one example, the antimicrobial agents can include a natural or synthetic chemical. In another example, the antimicrobial agents can include natural or synthetic chemicals that can be added to products such as foods, cosmetics or pharmaceuticals to prevent spoilage of the products by one or more microorganisms. In yet another example, the antimicrobial agents can prevent the growth of, or kill molds, yeasts, bacteria, or a combination thereof. In yet another example, the bacteria can include Gram-negative bacteria, such as *Escherichia coli*, Gram-positive bacteria, such as *Staphylococcus aureus*, or a combination thereof.

The term "microbe", "microbial" or "microorganism" refers to any microorganism including prokaryotes, such as bacteria, either gram-negative or gram-positive, and archaea; eukaryotes, such as yeasts, algae, and mold; and viruses.

The term "(meth)acrylate" means methacrylate or acrylate.

The term "two-pack coating composition", also known as 2K coating composition, refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The pot mix is then applied as a layer of a desired thickness on a substrate surface, such as an automobile body. After application, the layer dries and cures at ambient or at elevated temperatures to form a coating on the substrate surface having desired coating properties, such as, high gloss, mar-resistance and resistance to environmental etching.

The term "one-pack coating composition", also known as 1K coating composition, refers to a coating composition having one package that is stored in one container and sealed to increase the shelf life of the coating composition during storage. The 1K coating composition can be formulated to be cured at certain curing conditions. Examples of such curing conditions can include: radiation, such as UV radiation including UV-A, UV-B, and UV-C radiations, electron beam (e-beam) radiation, infrared (IR) radiation, or lights in visible or invisible wavelengths; moisture, such as water accessible to the coating composition; thermal energy, such as high temperatures; or other chemical or physical conditions.

The term 2K or two-pack adhesive, 2K or two-pack sealant, refers to an adhesive or sealant having two packages that are stored in separate containers and sealed to increase the shelf life during storage. The two packages are mixed just prior to use to form a pot mix, which has a limited pot life, typically ranging from a few minutes (15 minutes to 45 minutes) to a few hours (4 hours to 8 hours).

The term 1K or one-pack adhesive, 1K or one-pack sealant, refers an adhesive or sealant having one package that is stored in one container and sealed to increase the shelf life during storage. The 1K adhesive or sealant can be formulated to be cured at any of the aforementioned individual curing conditions, or a combination thereof.

The term "crosslinkable component" refers to a component having "crosslinkable functional groups" that are functional groups positioned in the molecule of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acid or polyacid, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The term "crosslinking component" refers to a component having "crosslinking functional groups" that are functional groups positioned in the molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acid or polyacid, acetoacetoxy, carboxyl, primary amine, secondary amine, epoxy, anhydride, ketimine, aldimine, orthoester, orthocarbonate, cyclic amide or a workable combination thereof.

It would be clear to one of ordinary skill in the art that certain crosslinking functional groups crosslink with certain crosslinkable functional groups. Examples of paired combinations of crosslinkable and crosslinking functional groups can include: (1) ketimine functional groups crosslinking with acetoacetoxy, epoxy, or anhydride functional groups; (2) isocyanate, thioisocyanate and melamine functional groups each crosslinking with hydroxyl, thiol, primary and secondary amine, ketimine, or aldimine functional groups; (3) epoxy functional groups crosslinking with carboxyl, primary and secondary amine, ketimine, or anhydride functional groups; (4) amine functional groups crosslinking with acetoacetoxy functional groups; (5) polyacid functional groups crosslinking with epoxy or isocyanate functional groups; and (6) anhydride functional groups generally crosslinking with epoxy and ketimine functional groups.

The term "vehicle", "automotive", "automobile", "automotive vehicle", or "automobile vehicle" refers to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

The term "comprising" or "comprise" is also meant "containing", "having", "including", "encompassing", "involving", "incorporating", or other terms such as "bearing", "carrying", or "holding".

This disclosure is directed to a thermoset composition. The thermoset composition can comprise:

A) a thermosetting component; and

B) a polytrimethylene ether glycol having a Mn (number average molecular weight) in a range of from 100 to 490;

wherein said thermoset composition is an adhesive, a sealant, or a combination thereof.

The thermosetting component can comprise one or more polymers. The one or more polymers can be selected from one or more acrylic polymers, one or more polyester polymers, one or more polyesterurethanes, one or more polyetherurethanes, one or more poly(meth)acrylamides, one or more polyepoxides, one or more polycarbonates, or a combination thereof.

The acrylic polymers can have a weight average molecular weight (Mw) of about 1,000 to 100,000 and can contain functional groups or pendant moieties such as, for example, hydroxyl, amino, amide, glycidyl, silane, carboxyl groups or any other aforementioned crosslinkable functional groups. These acrylic polymers can be straight chain polymers or copolymers, branched polymers or copolymers, block copolymers, or graft copolymers. In one example, the one or more crosslinkable functional groups can be selected from hydroxyl groups, carboxyl groups, glycidyl groups, amino groups, silane groups, or a workable combination thereof.

The acrylic polymers can be polymerized from a plurality of unsaturated monomers, such as acrylates, methacrylates, or derivatives thereof, or any monomers suitable for acrylic polymers that are known to or developed by those skilled in the art. One or more of the unsaturated monomers can have crosslinkable functional groups or pendant moieties selected from hydroxyl groups, carboxyl groups, glycidyl groups, amino groups, silane groups, or a workable combination thereof. Examples of suitable unsaturated monomers can include linear alkyl (meth)acrylates, cyclic or branched alkyl (meth)acrylates, such as isobornyl (meth)acrylate, styrene, alpha methyl styrene, vinyl toluene, (meth)acrylonitrile, and (meth)acryl amides. Monomers can have crosslinkable functional groups. Unsaturated monomers that do not contain additional functional groups can also be suitable, for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers can include styrene, alpha-methylstyrene, chlorostyrenes, 2,5-dimethylstyrene, p-methoxystyrene, and vinyl toluene.

The acrylic polymers of this disclosure can generally be polymerized by free-radical copolymerization using conventional processes well known to those skilled in the art, for example, bulk, solution or bead polymerization, in particular by free-radical solution polymerization using free-radical initiators. Acrylic polymers produced via other polymerization processes can also be suitable.

The acrylic polymers can contain (meth)acrylamides. Typical examples of such acrylic polymers can be polymerized from monomers including (meth)acrylamide. In one example, such acrylic polymer can be polymerized from (meth)acrylamide and alkyl (meth)acrylates, hydroxy alkyl (meth)acrylates, (meth)acrylic acid and one of the aforementioned olefinically unsaturated monomers.

Acrylourethanes also can be suitable for the thermosetting component. Typical useful acrylourethanes can be formed by reacting the aforementioned acrylic polymers with an organic polyisocyanate. Generally, an excess of the acrylic polymer can be used so that the resulting acrylourethane can have terminal acrylic segments having reactive groups as described above. These acrylourethanes can have reactive end groups and/or pendant groups such as hydroxyl, carboxyl, amine, glycidyl, amide, silane or mixtures of such groups. Useful organic polyisocyanates are described hereinafter as the crosslinking component but also can be used to form acrylourethanes useful in this invention. Examples of typically useful acrylourethanes can include those disclosed in Stamegna et al. U.S. Pat. No. 4,659,780.

The polyester polymers can be saturated or unsaturated and optionally, may be modified with fatty acids. The polyester polymers can be the esterification product of one or more polyhydric alcohols, such as, alkylene diols and glycols; monocarboxylic acids and a polycarboxylic acids or anhydrides thereof, such as, dicarboxylic and/or tricarboxylic acids or tricarboxylic acid anhydrides. The polyester polymers can have one or more aforementioned crosslinkable functional groups. The polyester polymers can be linear or branched.

Examples of polyhydric alcohols that can be used to form the polyester can include triols and tetraols, such as, trimethylol propane, triethylol propane, trimethylol ethane, glycerine, and dihydric alcohols and diols that include ethylene glycol, propylene glycol, 1,3-propanediol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexane dimethanol, hydrogenated bisphenols A and F, Esterdiol 204 (Trademark of Union Carbide) and highly functional polyols, such as, trimethylolethane, trimethylolpropane, and pentaerythritol. Polyhydric alcohols having carboxyl groups may be used, such as, dimethylol propionic acid (DMPA).

Typical acids and anhydrides that can be used to form the polyester polymers can include aliphatic or aromatic carboxylic acids and anhydrides thereof, such as, adipic acid, azelaic acid, sebacic acid, dimerized fatty acids, maleic acid, maleic anhydride, succinic acid, succinic anhydride, isophthalic acid, terephthalic acid, phthalic acid, phthalic anhydride, dimethyl terephthalic acid, naphthalene dicarboxylic acid, tetrahydro- and hexahydrophthalic anhydride, tetrachlorophthalic acid, terephthalic acid bisglycol ester, benzophenone dicarboxylic acid, trimellitic acid and trimellitic anhydride.

The polyesterurethanes can be formed by reacting the aforementioned polyesters with an organic polyisocyanate. Generally, an excess of the polyester is used so that the resulting polyesterurethane has terminal polyester segments having reactive hydroxyl groups. Carboxy functional polyesterurethanes can also be used. Useful organic polyisocyanates are described hereinafter as the crosslinking component but can be used to form polyesterurethanes useful in this invention. Examples of typically useful coating compositions that utilize polyesterurethanes can include those disclosed in U.S. Pat. No. 5,122,522.

The polycarbonates can be esters of carbonic acid which are obtained by the reaction of carbonic acid derivatives, e.g., diphenyl carbonate or phosgene with polyols, preferably diols. Suitable diols can be any of those mentioned above.

The polyetherurethanes can be the reaction product of a polyetherpolyol and/or polylactonepolyol and an organic polyisocyanate.

The polyepoxides can be poly epoxy hydroxy ether resins having 1,2-epoxy equivalency of about two or more, that is, polyepoxides that have on an average basis two or more epoxy groups per molecule. Preferred polyepoxides are polyglycidyl ethers of cyclic polyols. Particularly preferred are polyglycidyl ethers of ployhydric phenols, such as, bisphenol A or bisphenol F. Such polyepoxides can be produced by the etherification of polyhydric phenols with epihalohydrin or dihalohydrin, such as, epichlorohydrin or dichlorohydrin in the presence of alkali. Examples of useful polyhydric phenols are 2,bis-(4-hydroxyphenyl)ethane, 2-methyl-1,1-bis-(4-hydroxyphenyl)propane and the like. Besides polyhydric phenols, other cyclic polyols can be used to prepare the polyglycidyl ethers, such as, alicyclic phenols, particularly, cycloaliphatic polyols, and hydrogenated bisphenol A.

The polyepoxides can be chain extended with polyether or polyester polyols, such as, polycaprolactone diols and with ethoxylated bisphenol A.

The poly(meth)acrylamides can be, such as, polymers of (meth)acrylamide and alkyl (meth)acrylates, hydroxy alkyl (meth)acrylates, (meth)acrylic acid and or one of the aforementioned ethylenically unsaturated polymerizable monomers.

In one example, the thermosetting component can comprise one or more of the aforementioned polymers. In another example, the thermosetting component can comprise a crosslinkable component that comprises one or more of the aforementioned polymers having one or more of the aforementioned crosslinkable functional groups, and a crosslinking component that comprises one or more crosslinking agents having one or more of the aforementioned crosslinking functional groups.

The polymers can have one or more crosslinkable functional groups that can be selected from hydroxyl groups, carboxyl groups, glycidyl groups, amino groups, silane groups, or a combination thereof. The one or more functional groups can be from monomers that are used to produce the polymer, or be added to or modified on the polymer after polymerization. When more than one polymer is present in the thermoset composition, the crosslinkable functional groups can be on one or more of the polymers. In one example, the thermoset composition can comprise acrylic polymers. In another example, the thermoset composition can comprise polyesters. In yet another example, the thermoset composition can comprise acrylic polymers and polyesters. The crosslinkable functional groups can be on the acrylic polymers, the polyesters, or both the acrylic polymers and the polyesters.

The one or more crosslinking functional groups can be one or more isocyanate groups. The crosslinking agent can be selected from aliphatic polyisocyanates, cycloaliphatic polyisocyanates, aromatic polyisocyanates, trifunctional isocyanates, isocyanate adducts, or a combination thereof. The crosslinking agent can also be selected from isophorone diisocyanate, toluene diisocyanate, hexamethylene diisocyanate, diphenylmethane diisocyanate, triphenyl triisocyanate, benzene triisocyanate, toluene triisocyanate, the trimer of hexamethylene diisocyanate, or a combination thereof. Other aliphatic, cycloaliphatic and aromatic polyisocyanates, including tri-functional isocyanates and trimers of diisocyanates, can also be suitable.

Other suitable crosslinking components can include melamine formaldehyde, benzoguanamine formaldehyde, and urea formaldehyde.

A silane crosslinking component can also be suitable. One example of silane crosslinking component can be an aminofunctional silane crosslinking agent. Examples of suitable aminofunctional silanes can include aminomethyltriethoxysilane, gamma-aminopropyltrimethoxysilane, gamma-aminopropyltriethoxysilane, gamma-aminopropylmethyldiethoxysilane, gamma-aminopropylethyldiethoxysilane, gamma-aminopropylphenyldiethoxyysilane, N-beta(aminoethyl)gamma-aminopropyltrimethoxysilane, delta-aminobutyltriethoxysilane, delta-aminobutylethyldiethoxysilane and diethylene triamino propylaminotrimethoxysilane. Preferred are N-beta(aminoethyl)gamma-aminopropyltrimethoxysilane commercially sold as Silquest® A 1120 and diethylene triamino propylaminotrimethoxysilane that is commercially sold as Silquest® A 1130. Both of theses silanes are sold by OSi Specialties, Inc. Danbury, Conn., under respective registered trademarks.

When an amino silane crosslinking agent is used, additional amino functional curing agents, such as, primary, secondary and tertiary amines, that are known in the art can be added. Typically, aliphatic amines containing a primary amine group, such as, diethylene triamine, and triethylene tetramine can be added. Tertiary amines, such as, tris-(dimethyl aminomethyl)-phenol can also be used.

The polytrimethylene ether glycol can be prepared by an acid-catalyzed polycondensation of 1,3-propanediol (herein referred to as "PDO"), which is also synonymous to "trimethylene glycol", such as described in U.S. Pat. Nos. 6,977,291 and 6,720,459. The polytrimethylene ether glycol can also be prepared by a ring opening polymerization of a cyclic ether, oxetane, such as described in J. Polymer Sci., Polymer Chemistry Ed. 28, 449 to 444 (1985). The polycondensation of 1,3-propanediol is preferred over the use of oxetane since the diol is a less hazardous, stable, low cost, commercially available material and can be prepared by use of petro chemical feed-stocks or renewable resources.

A bio-route via fermentation of renewable resources can be used to obtain the 1,3-propanediol (PDO). One example of the renewable resources is corn since it is readily available and has a high rate of conversion to 1,3-propanediol and can be genetically modified to improve yields to the 1,3-propanediol. Examples of typical bio-route can include those described in U.S. Pat. No. 5,686,276, U.S. Pat. No. 5,633,362 and U.S. Pat. No. 5,821,092. The 1,3-propanediol obtained from the renewable source and the thermoset compositions therefrom can be distinguished from their petrochemical derived counterparts on the basis of radiocarbon dating such as fraction of modern carbon ($f_M$), also know as $^{14}C$ ($f_M$) and dual carbon-isotopic fingerprinting $^{13}C/^{12}C$ such as the one known as $\delta^{13}C$. The fraction of modern carbon $f_M$ is defined by National Institute of Standards and Technology (NIST) Standard Reference Materials (RFMs) 4990B and 49900.

The radiocarbon dating method usefully distinguishes chemically-identical materials, and apportions carbon in the polymer by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," Characterization of Environmental Particles, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship $$t=(-5730/0.693)\ln(A/A_0)$$

where t=age, 5730 years is the half-life of radiocarbon, and A and $A_0$ are the specific $^{14}C$ activity of the sample and of the modern standard, respectively (Hsieh, Y., Soil Sci. Soc. Am J., 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2 \times 10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-Industrial Revolution wood. For the current living biosphere, such as current plant materials or components derived from current plant materials, herein referred to as new carbon materials, $f_M \approx 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the present disclosure is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphoenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. −10 to −14 per mil ($C_4$) and −21 to −26 per mil ($C_3$) (Weber et al., J. Agric. Food Chem., 45, 2942 (1997)). Coal and petroleum fall generally in this latter range. The $^{13}C$ measurement scale was originally defined by a zero set by pee dee belemnite (herein referred to as PDB) limestone, where values are given in parts per thousand deviations from this material. The "$\delta^{13}C$" values are in parts per thousand (per mil), abbreviated as ‰, and are calculated as follows:

$$\delta^{13}C \equiv \frac{(^{13}C/^{12}C)\text{sample} - (^{13}C/^{12}C)\text{standard}}{(^{13}C/^{12}C)\text{standard}} \times 1000\%$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Bio-derived 1,3-propanediol, and resulted compositions, such as polytrimethylene ether glycol, comprising bio-derived 1,3-propanediol, therefore, can be completely distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new carbon materials" and "old carbon materials" (for example, carbon materials from petroleum products) can be distinguished from products made only of "old carbon materials" by isotope profiles.

The polytrimethylene ether glycol can have a Mn in a range of from 100 to 650. In one example, the polytrimethylene ether glycol can have a Mn in a range of from 100 to 490. In another example, the polytrimethylene ether glycol can have a Mn in a range of from 200 to 490. In yet another example, the polytrimethylene ether glycol can have a Mn in a range of from 250 to 490. In yet another example, the polytrimethylene ether glycol can have a Mn in a range of from 100 to 310. In yet another example, the polytrimethylene ether glycol can have a Mn in a range of from 100 to 250. The polytrimethylene ether glycol suitable for this disclosure need to be within the aforementioned range of Mn that can be controlled by polymerization process to have polymers with desired range of Mn, fractionation of polymers to obtain polymers having desired Mn distribution, or a combination thereof. The polymerization can be controlled, for example by polymerization timing, reaction temperature, reaction pressure, or a combination thereof, to produce polymers having Mn within the aforementioned range.

The polytrimethylene ether glycol can be fractionated or unfractionated. The unfractionated polytrimethylene ether glycol can have un-polymerized monomers and polymerized oligomers or polymers, such as dimers, trimers, tetramers, and pentamers. In one example, the unfractionated polytrimethylene ether glycol can have, such as, 1,3-propanediol (PDO) monomers, dimers (also referred to as "trimethylene glycol dimers", "1,3-propanediol dimers", or "di(1,3-propanediol)"), trimers (also referred to as "trimethylene glycol trimers"), tetramers (also referred to as "trimethylene glycol tetramers"), pentamers (also referred to as "trimethylene glycol pentamers"), hexamers (also referred to as "trimethylene glycol hexamers") and heptamers (also referred to as "trimethylene glycol heptamers"). The fractionated polytrimethylene ether glycol can have different contents based on fractionation. In one example, the fractionated polytrimethylene ether glycol can have PDO monomers, dimers, trimers, tetramers, and pentamers. In another example, the fractionated polytrimethylene ether glycol can have PDO dimers, trimers, tetramers, and pentamers. In yet another example, the fractionated polytrimethylene ether glycol can have trimers, tetramers, pentamers and hexamers. In further example, the fractionated polytrimethylene ether glycol can have tetramers, pentamers, hexamers and heptamers. The fractionated polytrimethylene ether glycol can comprise in a range of from 10% to 100% of trimethylene glycol dimers in one example, 20% to 100% of trimethylene glycol dimers in another example, 30% to 100% of trimethylene glycol dimers in yet another example, 40% to 100% of trimethylene glycol dimers in yet another example, in a range of from 50% to 100% of trimethylene glycol dimers in yet another example, all percentage based on the total weight of the polytrimethylene ether glycol.

The polytrimethylene ether glycol can include copolymers of polytrimethylene ether glycol that can also be suitable for the thermoset composition of this disclosure. Examples of such suitable copolymers of polytrimethylene ether glycol can be prepared by copolymerizing 1,3-propanediol with another diol, such as, ethane diol, 1,2-propanediol, hexane diol, 2-methyl-1,3-propanediol, 2,2-dimethyl-1,3-propanediol, trimethylol propane and pentaerythritol. In one example, the copolymers of polytrimethylene ether glycol can be polymerized from monomers have 1,3-propanediol in a range of from 50% to 99%. In another example, the copolymers of polytrimethylene ether glycol can be polymerized from monomers have 1,3-propanediol in a range of from 60% to 99%. In yet another example, the copolymers of polytrimethylene ether glycol can be polymerized from monomers have 1,3-propanediol in a range of from 70% to 99%.

The polytrimethylene ether glycol useful in the compositions and methods disclosed herein can contain small amounts of other repeat units, for example, from aliphatic or aromatic diacids or diesters, such as disclosed in U.S. Pat. No. 6,608,168. This type of trimethylene ether glycol oligomer can also be called a "random polytrimethylene ether ester", and can be prepared by polycondensation of 1,3-propanediol reactant and about 10 to about 0.1 mole % of aliphatic or aromatic diacid or esters thereof, such as terephthalic acid, isophthalic acid, bibenzoic acid, naphthalic acid, bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, p-(hydroxyethoxy)benzoic acid, and combinations thereof, and dimethyl terephthalate, bibenzoate, isophthlate, naphthalate and phthalate; and combinations thereof. Of these, terephthalic acid, dimethyl terephthalate and dimethyl isophthalate are preferred.

The polytrimethylene ether polymers with functional groups other than hydroxyls end groups can also be used. Examples of polytrimethylene ether glycol oligomers with amine and ester end functional groups can include those disclosed in U.S. Patent Publication No. 2008/0108845 with Ser. No. 12/704,867.

The polytrimethylene ether glycol can have in a range of from 10% to 100% of trimethylene glycol dimers, percentage based on the total weight of the polytrimethylene ether glycol. The polytrimethylene ether glycol can have in a range of from 10% to 100% of trimethylene glycol dimers in one example, in a range of from 20% to 100% of trimethylene glycol dimers in another example, in a range of from 30% to 100% of trimethylene glycol dimers in another example, and in a range of from 40% to 100% of trimethylene glycol dimers in a yet further example, or in a range of from 50% to 100% of trimethylene glycol dimers in yet another example, all percentage based on the total weight of the polytrimethylene ether glycol. Fractionation, distillation or other separation or purification techniques can be used to produce polytrimethylene ether glycol having desired contents of dimers, trimers, or tetramers, etc. Fractionation, distillation or other separation or purification techniques can also be used to remove undesired contents from polytrimethylene ether glycol.

The polytrimethylene ether glycol can be polymerized from bio-derived 1,3-propanediol. The polytrimethylene ether glycol can be polymerized from monomers comprising in a range of from 10% to 100% of bio-derived 1,3-propanediol in one example, in a range of from 20% to 100% of bio-derived 1,3-propanediol in another example, in a range of from 40% to 100% of bio-derived 1,3-propanediol in yet another example, in a range of from 60% to 100% of bio-derived 1,3-propanediol in yet another example, in a range of from 80% to 100% of bio-derived 1,3-propanediol in yet another example, and 100% of bio-derived 1,3-propanediol in a further example, all percentage based on the total weight of monomers used for polymerizing the polytrimethylene ether glycol.

The thermoset composition can comprise in a range of from 0.01% to 20% of the polytrimethylene ether glycol, percentage based on the total weight of the thermoset composition. The thermoset composition can comprise in a range of from 0.01% to 20% of the polytrimethylene ether glycol in one example, in a range of from 0.1% to 20% of the polytrimethylene ether glycol in another example, in a range of from 0.5% to 20% of the polytrimethylene ether glycol in yet another example, and in a range of from 1% to 20% of the polytrimethylene ether glycol in yet another example. In a further example, the thermoset composition can comprise in a range of from 0.01% to 20% of the trimethylene glycol dimers. In an even further example, the thermoset composition can comprise in a range of from 0.1% to 20% of the trimethylene glycol dimers. In a yet even further example, the thermoset composition can comprise in a range of from 0.5% to 20% of the trimethylene glycol dimers. In a yet even further example, the thermoset composition can comprise in a range of from 0.5% to 5% of the trimethylene glycol dimers. All percentages are based on the total weight of the thermoset composition.

The thermoset composition can be formulated to have the polytrimethylene ether glycol in free form wherein the polytrimethylene ether glycol is not incorporated into the polymers of the thermosetting component by one or more covalent bonds between the polytrimethylene ether glycol and the polymers of the thermosetting component. In one example, the polytrimethylene ether glycol in a thermoset composition can be in the free form. In another example, the polytrimethylene ether glycol in a coating formed from a thermoset coating composition can be in the free form.

The thermoset composition can comprise in a range of from 0.1% to 20% of the polytrimethylene ether glycol in free form in one example, in a range of from 0.5% to 20% of the polytrimethylene ether glycol in free form in another example, in a range of from 1% to 20% of the polytrimethylene ether glycol in free form in yet another example, all percentages based on the total weight of the thermoset composition.

The polytrimethylene ether glycol can comprise in a range of from 20% to 100% of trimethylene glycol dimers, percentage based on the total weight of the polytrimethylene ether glycol. The trimethylene glycol dimers can be polymerized from bio-derived 1,3-propanediol.

The thermoset composition can comprise in a range of from 20% to 80% of water in one example, in a range of from 40% to 80% of water in another example, percentage based on total weight of the thermoset composition. The thermoset composition can also comprise one or more organic solvents or one or more reactive diluents. Water miscible organic solvent can be suitable. The thermoset composition can comprise one or more detergents, surfactants, or emulsion agents.

The thermoset composition of this disclosure can be used as a primer, a basecoat, a top coat, or a clearcoat. It can also be used as a single layer coat that can function as a primer, a basecoat and a top coat.

The thermoset composition can be a latex coating composition. The polytrimethylene ether glycol can be added into any latex paints to form the thermoset composition of this disclosure.

In one example, the polytrimethylene ether glycol can be added to a waterborne polyurethane copolymer basecoat composition to form the thermoset composition of this disclosure. In another example, the polytrimethylene ether glycol can be added to a waterborne polyurethane copolymer topcoat composition to form the thermoset composition of this disclosure.

The thermosetting component of the thermoset composition can comprise:
(i) one or more functional polymers having one or more crosslinkable functional groups.

The one or more crosslinkable functional groups can be selected from hydroxyl groups, thiol groups, epoxy groups, anhydride groups, carboxyl groups, glycidyl groups, amino groups, silane groups, or a workable combination thereof.

The crosslinkable component can also comprise orthoester, orthocarbonate, cyclic amide, amide acetal groups, or a combination thereof. These groups can be converted into crosslinkable functional groups under certain conditions, such as in the presence of water.

The thermosetting component of the thermoset composition can further comprise:
(ii) a crosslinking component comprising one or more crosslinking functional groups that react with the crosslinkable functional groups.

The one or more crosslinking functional groups can be selected from isocyanate, thioisocyanate, carboxyl, ketimine, aldimine, or a workable combination thereof.

The isocyanate can be selected from aliphatic polyisocyanates, cycloaliphatic polyisocyanates, aromatic polyisocyanates, trifunctional isocyanates, isocyanate adducts or a combination thereof. In one example, the isocyanate can be selected from isophorone diisocyanate, toluene diisocyanate, hexamethylene diisocyanate, diphenylmethane diisocyanate, triphenyl triisocyanate, benzene triisocyanate, toluene triisocyanate, the trimer of hexamethylene diisocyanate, or a combination thereof.

The crosslinking component can comprise one or more blocked isocycanates.

For a thermoset composition comprising hydroxyl-reactive crosslinking functional groups, such as isocyanate groups, the thermoset composition can be formulated so that some or all of the polytrimethylene ether glycol can be in the free form. In one example, the thermoset composition can be formulated so that polytrimethylene ether glycol is in excess in relation to the crosslinking agent. In another example, the polytrimethylene ether glycol can be added to the composition after the addition of the crosslinking agent, but prior to the complete curing (also known as "setting") of the thermoset composition. For example, some or all of the polytrimethylene ether glycol of a thermoset composition can be mixed with components of the thermoset composition after atomization of those components via a 2-component spray gun.

The thermoset composition can further comprise one or more pigments. Any pigments suitable for coatings, including those effect pigments such as metallic flakes, pearlescent pigments, or a combination thereof, can be suitable. Inorganic and organic colored pigments, metallic flakes and powders, such as, aluminum flake and aluminum powders; special effects pigments, such as, coated mica flakes, coated aluminum flakes colored pigments, or a combination thereof, can be suitable. Transparent pigments or pigments having the same refractive index as the cured binder can also be suitable. Any pigments suitable for adhesives or sealants can be suitable. Some pigments can be suitable for coatings, adhesives and sealants.

The thermoset composition can further comprise one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof.

When the thermosetting component comprises the crosslinkable component and the crosslinking component, the thermoset composition can be formulated as one-pack (1K) or two-pack (2K) composition depending upon the type of crosslinking agent. If polyisocyanates with free isocyanate groups are used as the crosslinking agent, the thermoset composition can be formulated as a two-pack composition in that the crosslinking agent is mixed with other components of the composition only shortly before use. The aforementioned polytrimethylene ether glycol can be added with the crosslinkable component. If blocked polyisocyanates are, for example, used as the crosslinking agent, the compositions can be formulated as a one-pack (1K) composition. For coating applications, the thermoset composition can be further adjusted to spray viscosity with organic solvents before being applied as determined by those skilled in the art.

In a typical two-pack coating composition, the two packages can be mixed together shortly before application. The first package typically can contain the polymer having one or more crosslinkable functional groups, and the polytrimethylene ether glycol and, optionally, the pigments. The pigments can be dispersed in the first package using conventional dispersing techniques, for example, ball milling, sand milling, and attritor grinding. The second package can contain the crosslinking agent, such as, a polyisocyanate crosslinking agent, and solvents.

This disclosure is also directed to an antimicrobial thermoset composition comprising in a range of 0.1% to 20% of the aforementioned polytrimethylene ether glycol. The antimicrobial thermoset composition can comprise in a range of 0.1% to 20% of the aforementioned trimethylene glycol dimers.

This disclosure is also directed to an antimicrobial coating composition, an antimicrobial coating layer, an antimicrobial adhesive or an antimicrobial sealant formed from the thermoset composition of this disclosure, wherein the antimicrobial coating composition, the antimicrobial coating layer, the adhesive or the sealant comprises the aforementioned polytrimethylene ether glycol having a Mn (number average molecular weight) in a range of from 100 to 490. The polytrimethylene ether glycol can comprise trimethylene glycol dimers. The antimicrobial adhesive or sealant can comprise polytrimethylene ether glycol or the trimethylene glycol dimers that can be polymerized from bio-derived 1,3-propanediol.

The antimicrobial coating layer, the adhesive or the sealant can be cured at ambient temperatures, such as in a range of from 15° C. to 35° C., or at elevated temperatures, such as at temperatures in a range of from 35° C. to 150° C. Typical curing temperatures of 15° C. to 80° C., in particular of 15° C. to 60° C., can be used for vehicle repair or refinish coatings. The wet coating layer can be cured at a temperature in a range of from 15° C. to 60° C. in one example, at a temperature in a range of from 15° C. to 50° C. in another example, and at a temperature in a range of from 15° C. to 35° C. in yet another example.

The coating composition according to the disclosure can be suitable for vehicle and industrial coating and can be applied using known processes. In the context of vehicle coating, the coating composition can be used both for vehicle original equipment manufacturing (OEM) coating and for repairing or refinishing coatings of vehicles and vehicle parts.

The coating composition can be applied by conventional techniques, such as, spraying, electrostatic spraying, dipping, brushing, and flow coating. Typically, the coating is applied to a dry film thickness in a range of from 0.01 mm to 2 mm in one example, in a range of from 0.05 mm to 2 mm in another example, and in a range of from 0.5 mm to 2 mm in yet another example.

Any of the aforementioned substrates can be suitable. A substrate having one or more existing coating layers can also be suitable.

The adhesive or sealant can be applied by conventional techniques, such as spraying, electrostatic spraying, dipping, brushing, and flow coating, over desired one or more substrates. Typically, the adhesive or sealant can be applied over a wide range of thickness, such as in a range of from 0.01 mm to 10 mm depending on desired applications. In one example, the adhesive can be used for binding electrical parts or components together. In another example, the adhesive or sealant can be used to bind particles or small parts to form a composite material. In yet another example, the adhesive and sealant can be used to affix tiles to the wall. In yet another example, the sealant can be used to seal a wood surface. In yet another example, the adhesive and sealant can be used to seal gaps between two or more parts and bind the two or more parts together. The adhesive or the sealant can have higher solid contents, higher viscosity, or a combination thereof, compared to a typical coating composition. The adhesive or sealant can have a solid content equal to or higher than 60 wt % (weight percent) based on the total weight of the adhesive or sealant, a viscosity equal to or higher than 10,000 cP, or a combination thereof.

One advantage of the thermoset composition of this disclosure is that it contains a component that is derived from a renewable resource. Another advantage is that the thermoset composition can form an antimicrobial coating layer, adhesive, or sealant. Yet another advantage is that the antimicrobial agent of the thermoset composition of this disclosure is from a renewable resource and can be readily degradable once entering the environment.

Some thermoset compositions, especially the waterborne ones, can be prone to microbe growth. That would shorten the storage time of the composition especially when a single can of the composition is repeatedly used and stored. The thermoset composition of this disclosure can provide improved storage time due to antimicrobial effects of the polytrimethylene ether glycol having a Mn (number average molecular weight) in a range of from 100 to 650, preferred in a range of from 100 to 490, particularly the trimethylene glycol oligomers, such as trimethylene glycol dimers. The thermoset composition can be an antimicrobial composition that can inhibit the growth of one or more bacteria. In one example, the bacteria can include Gram-negative bacteria, such as *Escherichia coli*, Gram-positive bacteria, such as *Staphylococcus aureus*, or a combination thereof.

Further, the thermoset composition comprising the polytrimethylene ether glycol having a Mn (number average molecular weight) in a range of from 100 to 650, can also have reduced foaming or reduced viscosity. The coatings, adhesives, or sealants formed from the thermoset composition of this disclosure can have improved properties, such as increased gloss, reduced drying time, increased pot life, or increased flexibility.

The present invention can be further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Testing Procedures

Dry Film Thickness—test method ASTM D4138.

Viscosity—(in Krebs unit)—determined according to ASTM D 562 Method D. Viscosity can also be measured in other units, such as centipoise (cP), Pascal-second (Pa·s), or any other units known to those skilled in the art.

Persoz Hardness Test—the change in film hardness of the coating was measured with respect to time after application by using a Persoz Hardness Tester Model No. 5854 [ASTM D4366] supplied by Byk-Mallinckrodt, Wallingford, Conn. The length of time to drop to a specified amplitude was recorded in seconds.

Molecular weight and hydroxyl number of the polytrimethylene ether diol are determined according to ASTM E222.

Molecular weights Mw and Mn and the polydispersity (Mw/Mn) of the acrylic polymer and other polymers are determined by GPC (Gel Permeation Chromatography) using polystyrene standards and tetrahydrofuran as the solvent.

Dry to touch time—Dry to touch time is determined by ASTM D1640.

Gloss of a coating can be measured by a method described in ASTM D523. Gloss can be measured by a gloss meter (Model AG-4435, BYK-Gardner, Columbia, Md. 21046).

Flexibility of coatings—Flexibility test can be done using Mandrel Bending test of attached organic coatings as described in ASTM D522 A. Flexibility of the coating can be shown as percent elongation in a range of from 2% (not flexible) to 30% (flexible).

Assay for antimicrobial activity—The Time-Kill test can be performed according to ASTM E2315-03. the results can be expressed as percent of reduction of the testing microbe: 0% reduction representing no antimicrobial activity and 100% reduction representing complete reduction of the microbes tested.

In the following examples, all parts and percentages are on a weight basis unless otherwise indicated. "Mw" weight average molecular weight and "Mn" means number average molecular weight. "PBW" means parts by weight.

EXAMPLES

Procedure 1

Preparation of Low Molecular Weight Polytrimethylene Ether Glycol

Twelve kilogram (kg) renewably sourced 1,3-propanediol (PDO) monomers commercially available from DuPont Tate & Lyle Bioproducts, Wilmington, Del., USA, were added to a 20 L glass reactor equipped with a condenser and an agitator. The glass reactor was purged with $N_2$ at the rate 3 L/min. Triflic acid (trifluoromethanesulfonic acid) was added into the reactor to a final concentration of 0.1 wt % and the mixture was heated up to 180° C. with agitation set to 200 RPM to allow the acid-catalyzed polycondensation to proceed. The reaction volatiles were condensed in the condenser and the crude polymer product was retained in the reactor. Crude polymer samples were taken periodically for color and molecular weight analysis. Once the desired Mn was achieved, the polymerization was terminated by turning the heat down. An antioxidant, BHT (Butylated hydroxyl toluene), available from Aldrich, St. Louis, Mo., USA, was added to the crude polymer to a final concentration about 200 ppm. The polymer was neutralized by treating the crude polymer with XUS ion exchange resin, available from Dow Chemical, Midland, Mich., USA, in 2 stages. In the first stage, 2 weight parts of the XUS ion exchange resin and 98 weight parts of the crude polymer were mixed at a temperature of about 105° C. for about 1 hour. In the second stage, an additional 2 weight parts of the XUS ion exchange resin was added to the crude polymer and further mixed for additional 3 hours. Neutralization was conducted under sub-surface nitrogen sparging of 5 L/min and a mixing speed of 200 RPM. The product was filtered to remove the ion exchange resin. Filtration was done at 60° C. Once the product was free of solids, it was dried by heating to about 95° C., with sub-surface nitrogen sparging of about 10 L/min and mixing speed of 150 RPM.

The product had about 2.7% of 1,3-propanediol monomer, 15% 1,3-propanediol dimer (also referred to as "trimethylene glycol dimer"), 80% or more of other oligomers of 1,3-propanediol including trimer, tetramer, pentamer, hexamer, heptamer, etc., percentage based on the total weight of the product.

Procedure 2

Fractionation of Low Molecular Weight Polytrimethylene Ether Glycol

To a 500 mL, 3-neck round bottom flask equipped with a mechanical stirrer, a distillation adapter, a condenser and a graduated distillation receiver, 367.6 g of polytrimethylene ether glycol having number average molecular weight of 250, as produced in Procedure 1, was added. The polymer was heated with a proportional integral derivative (PID) controller connected to a heating mantle and thermocouple. The controller was set to maintain a batch temperature of 50° C. at a power setting of 50% (300 mL-2 L). The fraction was collected from the overhead collection path by passing polymer product through a short path distillation unit at 100 mL/min, 130° C., 1.38 torr. The fractionated polymer product was analyzed by GC and contained 24.2% of 1,3-propanediol (PDO) monomer, 61.7% of 1,3-propanediol dimer (also referred to as "trimethylene glycol dimer"), and 15.1% of other oligomers of the 1,3-propanediol, percentage based on the total weight of the polymer product.

Calculated molecular weights (Mn) for the 1,3-propanediol oligomers are shown in Table 1.

TABLE 1

Molecular weight (Mn) of 1,3-propanediol oligomers.

| Polytrimethylene ether glycol | Calculated Mn |
|---|---|
| 1,3-propanediol dimer | 134 |
| 1,3-propanediol trimer | 192 |
| 1,3-propanediol tetramer | 250 |
| 1,3-propanediol pentamer | 308 |
| 1,3-propanediol hexamer | 366 |
| 1,3-propanediol heptamer | 424 |

Coating Compositions and Coating Properties

Coating compositions of Example 1 (Exp 1) and Comparative Example 1 (Comp 1) were prepared according to Table 2.

The coating compositions were applied to galvanized steel panels, available as Cat No. HDG70G70U from ACT Panels, Hillsdale, Mich., by drawdown blade to a thickness of about 4 mils (about 0.10 mm) and cured for 3 hours at 20° C. Coating properties were measured according to the Testing Procedures. The results are shown in Table 2.

TABLE 2

Coating Compositions with unfractionated polytrimethylene ether glycol (Weight Parts).

| | Comp 1 | Exp 1 |
|---|---|---|
| Thermosetting film forming component [1] | | |
| Imron ® ZV Part B | 100 | 100 |
| FG-572 Activator | 70 | 70 |
| Water | 10 | 0 |
| Unfractionated polytrimethylene ether glycol [2] | 0 | 10 |
| Viscosity (KU) | 70 | 65 |
| Dry Time (hour) | 4 | 3 |
| Pot Life (hour) | 1 | 3 |
| 60° Gloss | 80 | 90 |
| Volume increase of foam in 4-hours relative to fresh mixture [3] | 50% | 10% |
| Flexibility | 20% | 28% |
| Persoz hardness (Sec) | 70 | 50 |

[1] The thermosetting film forming component was Imron ® ZV-HG, available as a 2K package from E. I. du Pont de Nemours and Company, under the registered trademark. The Part B comprised polyurethane polymers having hydroxyl functional groups. FG-572 Activator comprised isocyanates.
[2] Unfractionated polytrimethylene ether glycol was from Procedure 1.
[3] Volume increase was measured from the scale on a plastic volumetric cylinder.

Coating compositions of Example 2 (Exp 2) and Comparative Examples 2-5 (Comp 2-5) were prepared according to Table 3.

The coating compositions were applied to galvanized steel panels, available as Cat No. HDG70G70U from ACT Panels, Hillsdale, Mich., by drawdown blade to a thickness of about 4 mils (about 0.10 mm) and cured for 3 hours at 20° C. Coating properties were measured according to the Testing Procedures. The results are shown in Table 3.

TABLE 3

Coating Compositions with unfractionated polytrimethylene ether glycol (Weight Parts).

| | Comp 2 | Comp 3 | Comp 4 | Comp 5 | Exp 2 |
|---|---|---|---|---|---|
| Thermosetting film forming component [4] | 100 | 100 | 100 | 100 | 100 |
| Water | 10 | — | — | — | — |
| Dowanol [5] | — | 10 | — | — | — |
| n-Pentanol [6] | — | — | 10 | — | — |
| Unfractionated polytrimethylene ether glycol [2] | — | — | — | — | 10 |
| High Molecular weight polytrimethylene ether glycol [7] | — | — | — | 10 | — |
| Viscosity (KU) | 60 | 70 | 65 | 65 | 60 |
| Dry Time (hour) | 1 | 3 | 2 | n/a [8] | 1 |
| 60° Gloss | 70 | 80 | 85 | n/a [8] | 90 |
| Flexibility | 20% | 20% | 20% | n/a [8] | 30% |

[2] Unfractionated polytrimethylene ether glycol was from Procedure 1.
[4] The thermosetting component was Imron ® Copolymer, available as a 1K package from E. I. du Pont de Nemours and Company, under the registered trademark.
[5] Dowanol was from Dow Chemical, Midland, Michigan.
[6] n-Pentanol was from Dow Chemical, Midland, Michigan
[7] High molecular weight polytrimethylene ether glycol having Mn in a range of from 1900 to 2100 is available as Cerenol ® H2000 from DuPont, Wilmington, DE, USA, under respective registered trademark of E. I. du Pont de Nemours and Company.
[8] Data were not available for Comp 5. The coating remained sticky over 24 hours.

Coating compositions of Examples 3 and 4 (Exp 3-4) and Comparative Example 6 (Comp 6) were prepared according to Table 4.

The coating compositions were applied to galvanized steel panels, available as Cat No. HDG70G70U from ACT Panels, Hillsdale, Mich., by drawdown blade to a thickness of about 4 mils and cured for 3 hours at 20° C. Antimicrobial activities of the coating were tested according to Time-Kill Test described in Testing Procedures. Microbial organism used for testing was *Escherichia coli*. Growth media was Tryptic Soy broth and agar and MacConkey agar. Neutralizer was Dey Engley broth. Contact time was 24 hours at a contact temperature of 20° C. The results are shown in Table 4.

TABLE 4

Coating Compositions with fractionated polytrimethylene ether glycol (Weight Parts).

| | Comp 6 | Exp 3 | Exp 4 |
|---|---|---|---|
| Thermosetting film forming component [9] | 100 | 100 | 100 |
| Fractionated polytrimethylene ether glycol [10] | 0 | 0.5 | 1 |
| Initial Concentration of *E. coli* (CFU/ml) | $5.4 \times 10^6$ | $5.4 \times 10^6$ | $5.4 \times 10^6$ |
| 24 hr Concentration of *E. coli* (CFU/ml) | $3.5 \times 10^7$ | $1.4 \times 10^3$ | 0 |
| % Reduction | 0 | 99.97% | 99.99% |

[9] The thermosetting film forming component was Imron ® 1.2 HG ™, available as a polyurethane 1K coating package from E. I. du Pont de Nemours and Company, under respective trademarks.
[10] Fractionated polytrimethylene ether glycol was from Procedure 2.

Adhesive and Sealant Compositions

Thermoset compositions (Exp 5 and 6) are prepared according to Table 5. The thermoset compositions can be used as an adhesive, a sealant or a combination thereof. The thermoset compositions can be applied and cured at temperatures in a range of from 15° C. to 50° C.

TABLE 5

Adhesive and Sealant Compositions (Grams).

|  | Exp 5 | Exp 6 |
|---|---|---|
| Acrylic-urethane polymer [11] | 111.4 | 111.4 |
| Surfactant Aerosol ® OT [12] | 2.2 | 2.2 |
| Surfactant Surfynol (R) 465 [13] | 2.2 | 2.2 |
| Defoaming agent Foamaster ® VF [14] | 1.4 | 1.4 |
| Pigment [15] | 218.6 | 218.6 |
| Grind above using a media mill. Then adding and mixing with the following: | | |
| Unfractionated polytrimethylene ether glycol [2] | 19.1 | — |
| Fractionated polytrimethylene ether glycol [10] | — | 19.1 |
| Acrylic-urethane polymer [11] | 603.0 | 603.0 |
| Water | 32.4 | 32.4 |
| Total (gram) | 990.3 | 990.3 |

[2] and [10] See footnotes in previous Tables.
[11] The acrylic-urethane polymer is Hybridur ® 540 available from Air Products and Chemicals, Inc., Allentown, PA, USA, under respective registered trademark.
[12] The surfactant is available as Aerosol OT from Cytec Industries Inc., West Paterson, NJ, U.S.A..
[13] The Surfactant Surfynol ® 465 is available from Air Products and Chemicals, Inc., Allentown, PA, USA, under respective registered trademark.
[14] The Defoaming agent Foamaster ® VF is available from Cognis Corporation, Cincinnati, OH, USA, under respective registered trademark.
[15] The pigment is Vertal ® 77 Talc, available from Luzenac America, Inc., Rio Tinto Minerals, Centennial, CO, USA, under respective registered trademark.

What is claimed is:

1. An antimicrobial composition formed from a thermoset composition, wherein said antimicrobial composition comprises an acrylic polymer having crosslinkable hydroxyl functional groups, polytrimethylene ether glycol and an isocyanate as a crosslinking agent, and wherein said antimicrobial composition is an adhesive, a sealant, or a combination thereof, wherein the polytrimethylene ether glycol has a Mn (number average molecular weight) of from about 100 to about 310.

2. The antimicrobial composition of claim 1, wherein said polytrimethylene ether glycol comprises trimethylene glycol dimers that are polymerized from bio-derived 1,3-propanediol.

* * * * *